US012028673B2

(12) United States Patent
Lo et al.

(10) Patent No.: US 12,028,673 B2
(45) Date of Patent: Jul. 2, 2024

(54) DRIVING CIRCUIT AND WEARABLE SOUND DEVICE THEREOF

(71) Applicant: xMEMS Labs, Inc., Santa Clara, CA (US)

(72) Inventors: Chiung C. Lo, San Jose, CA (US); Shun-Nan Tai, Hsinchu (TW); Wen-Chien Chen, New Taipei (TW); Jing-Meng Liu, San Jose, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/366,637

(22) Filed: Aug. 7, 2023

(65) Prior Publication Data

US 2023/0388695 A1 Nov. 30, 2023

Related U.S. Application Data

(63) Continuation-in-part of application No. 17/842,810, filed on Jun. 17, 2022, now Pat. No. 11,884,535, (Continued)

(51) Int. Cl.
*H04R 1/10* (2006.01)

(52) U.S. Cl.
CPC ........ *H04R 1/1041* (2013.01); *H04R 2460/11* (2013.01)

(58) Field of Classification Search
CPC ........ H04R 17/00; H04R 7/06; H04R 19/005; H04R 7/10; H04R 31/003; H04R 7/26;
(Continued)

(56) References Cited

U.S. PATENT DOCUMENTS 5,970,998 A 10/1999 Talbot
8,532,320 B2 9/2013 Nordahn
(Continued)

FOREIGN PATENT DOCUMENTS

CN 101785327 A 7/2010
CN 104540776 A 4/2015
(Continued)

OTHER PUBLICATIONS

Liang, the specification, including the claims, and drawings in the U.S. Appl. No. 17/344,983, filed Jun. 11, 2021.
(Continued)

*Primary Examiner* — Carolyn R Edwards
*Assistant Examiner* — Julie X Dang
(74) *Attorney, Agent, or Firm* — Winston Hsu

(57) ABSTRACT

A driving circuit, configured to drive a venting device, includes a first node, a second node, and an amplifying circuit. The venting device, configured to be controlled to open a vent or seal the vent, includes a film structure, which includes a first flap and a second flap, and an actuator, which includes a first actuating portion disposed on the first flap and a second actuating portion disposed on the second flap. When the venting device is controlled to open the vent, the driving circuit generates a first voltage at the first node and generates a second voltage at the second node. When the venting device is controlled to seal the vent, the driving circuit generates a third voltage at both the first node and the second node. The first voltage is larger than the third voltage, and the third voltage is larger than the second voltage.

28 Claims, 10 Drawing Sheets

Related U.S. Application Data which is a continuation-in-part of application No. 17/344,980, filed on Jun. 11, 2021, now Pat. No. 11,399,228.

(60) Provisional application No. 63/050,763, filed on Jul. 11, 2020, provisional application No. 63/051,885, filed on Jul. 14, 2020, provisional application No. 63/171,919, filed on Apr. 7, 2021, provisional application No. 63/320,703, filed on Mar. 17, 2022, provisional application No. 63/415,664, filed on Oct. 13, 2022.

(58) Field of Classification Search
CPC ................ H04R 2440/01; H04R 19/02; H04R 2201/003; H04R 2499/11; H04R 19/04
See application file for complete search history.

(56) References Cited

U.S. PATENT DOCUMENTS

| | | | | |
|---|---|---|---|---|
| 8,724,200 | B1 | 5/2014 | Wu | |
| 10,067,734 | B2 | 9/2018 | Watson | |
| 10,367,540 | B1 | 7/2019 | Medapalli | |
| 11,323,797 | B2 | 5/2022 | Liang | |
| 11,399,228 | B2 | 7/2022 | Liang | |
| 2003/0029705 | A1 | 2/2003 | Qiu | |
| 2006/0131163 | A1 | 6/2006 | Mei | |
| 2007/0007858 | A1 | 1/2007 | Sorensen | |
| 2008/0267416 | A1 | 10/2008 | Goldstein | |
| 2011/0051985 | A1 | 3/2011 | Hwang | |
| 2011/0103616 | A1 | 5/2011 | Kwon | |
| 2011/0181150 | A1 | 7/2011 | Mahameed | |
| 2012/0053393 | A1 | 3/2012 | Kaltenbacher | |
| 2012/0082335 | A1 | 4/2012 | Duisters | |
| 2013/0121509 | A1 | 5/2013 | Hsu | |
| 2013/0223023 | A1 | 8/2013 | Dehe | |
| 2014/0140558 | A1 | 5/2014 | Kwong | |
| 2015/0163599 | A1 | 6/2015 | Shim | |
| 2015/0204940 | A1* | 7/2015 | Teeter | G01R 21/10 330/2 |
| 2015/0237438 | A1* | 8/2015 | Lee | H03G 3/348 381/74 |
| 2016/0176704 | A1 | 6/2016 | Cargill | |
| 2016/0381464 | A1 | 12/2016 | Elyada | |
| 2017/0011600 | A1 | 1/2017 | Joung | |
| 2017/0021391 | A1 | 1/2017 | Guedes | |
| 2017/0040012 | A1 | 2/2017 | Goldstein | |
| 2017/0041708 | A1 | 2/2017 | Barzen | |
| 2017/0164115 | A1 | 6/2017 | van Halteren | |
| 2017/0201192 | A1 | 7/2017 | Tumpold | |
| 2017/0217761 | A1 | 8/2017 | Chung | |
| 2017/0260044 | A1 | 9/2017 | Cargill | |
| 2017/0325030 | A1 | 11/2017 | Stoppel | |
| 2018/0002168 | A1 | 1/2018 | Cargill | |
| 2018/0020194 | A1 | 1/2018 | Kim | |
| 2018/0120938 | A1 | 5/2018 | Frescas | |
| 2019/0039880 | A1 | 2/2019 | Paci | |
| 2019/0098390 | A1 | 3/2019 | Carino | |
| 2019/0181776 | A1 | 6/2019 | Tumpold | |
| 2019/0208343 | A1 | 7/2019 | Monti | |
| 2019/0215620 | A1* | 7/2019 | Albahri | H04R 25/554 |
| 2019/0349665 | A1 | 11/2019 | Grinker | |
| 2020/0100033 | A1 | 3/2020 | Stoppel | |
| 2020/0178000 | A1 | 6/2020 | Niekiel | |
| 2020/0178003 | A1 | 6/2020 | Zurbruegg | |
| 2020/0193973 | A1 | 6/2020 | Tolomei | |
| 2020/0196067 | A1 | 6/2020 | Rusconi Clerici Beltrami | |
| 2020/0211521 | A1* | 7/2020 | Voss | H04R 7/04 |
| 2020/0213770 | A1 | 7/2020 | Duan | |
| 2020/0244275 | A1* | 7/2020 | Marzin | H03D 7/1441 |
| 2020/0352788 | A1 | 11/2020 | Van 'T Hof | |
| 2022/0014836 | A1 | 1/2022 | Liang | |

FOREIGN PATENT DOCUMENTS

| | | | |
|---|---|---|---|
| CN | 105009604 | A | 10/2015 |
| CN | 106937193 | A | 7/2017 |
| CN | 107223346 | A | 9/2017 |
| CN | 108702575 | A | 10/2018 |
| CN | 110022506 | A | 7/2019 |
| CN | 209402687 | U | 9/2019 |
| CN | 111063790 | A | 4/2020 |
| EP | 3 896 990 | A | 10/2021 |
| JP | 11-307441 | A | 11/1999 |
| JP | 2009-512375 | A | 3/2009 |
| JP | 2012-249184 | A | 12/2012 |
| JP | 2017-112531 | A | 6/2017 |
| JP | 2020-31444 | A | 2/2020 |
| JP | 2022-16392 | A | 1/2022 |
| KR | 10-2010-0002351 | A | 1/2010 |
| KR | 10-2012-0034085 | A | 4/2012 |
| KR | 10-2015-0030691 | A | 3/2015 |
| KR | 10-2015-0097292 | A | 8/2015 |
| KR | 10-2017-0139320 | A | 12/2017 |
| KR | 10-2022-0007717 | A | 1/2022 |
| TW | I650025 | B | 2/2019 |
| TW | 202203662 | A | 1/2022 |
| WO | 2019/177324 | A1 | 9/2019 |

OTHER PUBLICATIONS

Hyonse Kim et al., A slim type microvalve driven by PZT films, Sensors and Actuators A: Physical, Jan. 18, 2005, pp. 162-171, vol. 121, Elsevier B. V., XP027806904.

Wang Zhicheng, Stylish structure and innovative features of new generation speakers, Household Electric Appliances, Issue 12, 2003, p. 38-40, China Academic Journal Electronic Publishing House ,2003.

ZHOU Xiao-wei et al., Preliminary evaluation of predicative performance of BAHA softband in the conductive or mixed hearing loss patients, Journal of Otolaryngology and Ophthalmology of Shandong University, vol. 29, Issue No. 2, 2015, p. 28-30, China Academic Journal Electronic Publishing House. ,2015/04/16.

Stefan Liebich et al., active occlusion cancellation with hear-through equalization for headphones, Institute of Communication Systems, 2018 IEEE international conference on acoustics, speech and signal processing. Canada ,2018/04.

Shen Guohao et al., Structure optimization design for capacitive silicon-based MEMS microphone, Semiconductor Devices, vol. 43, No. 12, p. 912-917, China Academic Journal Electronic Publishing House. ,Dec. 3, 2018.

HUA Qing et al., Acoustoeletric model of piezoelectric microphone with package structure, Transducer and Microsystem Technologies, 2018 Vol. 37, No. 11, p. 42-44, China Academic Journal Electronic Publishing House. ,Nov. 3, 2018.

Chen Guidong et al., Highly sensitive MEMS humidity sensor based on candle-soot nanoparticle layer , Micronanoelectronic Technology, vol. 57, No. 1, p. 36-40, p. 48, China Academic Journal Electronic Publishing House ,Jan. 2020.

* cited by examiner

DRIVING CIRCUIT AND WEARABLE SOUND DEVICE THEREOF

CROSS REFERENCE TO RELATED APPLICATIONS

This application is a continuation-in-part of U.S. application Ser. No. 17/842,810, filed on Jun. 17, 2022, which is a continuation-in-part of U.S. application Ser. No. 17/344,980, filed on Jun. 11, 2021, which claims the benefit of U.S. Provisional Application No. 63/050,763, filed on Jul. 11, 2020, and claims the benefit of U.S. Provisional Application No. 63/051,885, filed on Jul. 14, 2020, and claims the benefit of U.S. Provisional Application No. 63/171,919, filed on Apr. 7, 2021. Besides, U.S. application Ser. No. 17/842,810 claims the benefit of U.S. Provisional Application No. 63/320,703, filed on Mar. 17, 2022. Further, this application claims the benefit of U.S. Provisional Application No. 63/415,664, filed on Oct. 13, 2022. The contents of these applications are incorporated herein by reference.

BACKGROUND OF THE INVENTION

1. Field of the Invention

The present invention relates to a driving circuit and a wearable sound device thereof, and more particularly, a driving circuit and a wearable sound device thereof, which reduce occlusion effect and improve lifetime of a venting device.

2. Description of the Prior Art

Occlusion effect arises from the sealed volume of an ear canal, which causes loud perceived sound pressure by the listener. For example, occlusion effect occurs when the listener wearing a wearable sound device in his/her ear canal engages in specific movement(s) that generate(s) bone-conducted sound (e.g., jogging). To enhance listening experience, there is room for further improvement when it comes to occlusion effect.

SUMMARY OF THE INVENTION

It is therefore a primary objective of the present application to provide a wearable sound device, to improve over disadvantages of the prior art.

An embodiment of the present application discloses a driving circuit, configured to drive a venting device, the driving circuit comprising a first node and a second node; and an amplifying circuit, comprising an amplifying output terminal coupled to the first node; wherein the venting device comprises a film structure and an actuator; wherein the film structure comprises a first flap and a second flap; wherein the actuator comprises a first actuating portion disposed on the first flap and a second actuating portion disposed on the second flap; wherein the first node is coupled to the first actuating portion and the second node is coupled to the second actuating portion; wherein the venting device is configured to be controlled to open a vent or seal the vent; wherein when the venting device is controlled to open the vent, the driving circuit generates a first voltage at the first node and generates a second voltage at the second node; wherein when the venting device is controlled to seal the vent, the driving circuit generates a third voltage at both the first node and the second node; wherein the first voltage is larger than the third voltage, and the third voltage is larger than the second voltage.

An embodiment of the present application discloses a wearable sound device, comprising a venting device, comprising a film structure and an actuator, wherein the film structure comprises a first flap and a second flap, and the actuator comprises a first actuating portion disposed on the first flap and a second actuating portion disposed on the second flap; a driving circuit, comprising a first node and a second node; wherein the first actuating portion and the second actuating portion are coupled to the first node and the second node; wherein the venting device is configured to be controlled to open a vent or seal the vent; wherein when the venting device is controlled to open the vent, the driving circuit generates a first voltage at the first node and generates a second voltage at the second node; wherein when the venting device is controlled to seal the vent, the driving circuit generates a third voltage at both the first node and the second node; wherein the first voltage is larger than the third voltage, and the third voltage is larger than the second voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
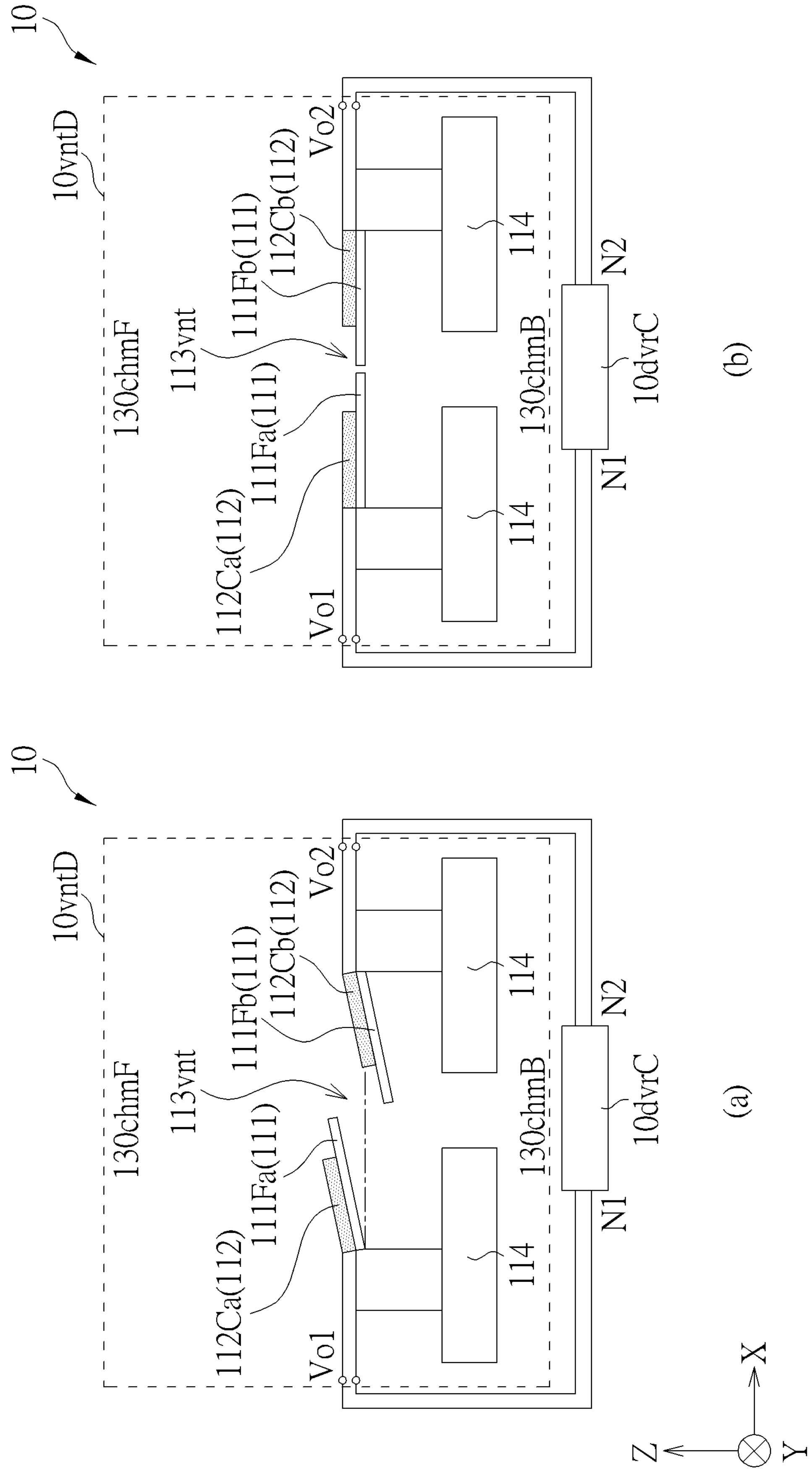
FIG. 1 is a schematic diagram of a wearable sound device according to embodiments of the present application.

FIG. 1 is a schematic diagram of a wearable sound device 10 according to embodiments of the present application. The wearable sound device 10 (e.g., an in-ear device) may include a venting device 10vntD and a driving circuit 10dvrC.

The venting device 10vntD, configured to be controlled to open a vent 113vnt or seal the vent 113vnt, may include a film structure 111 and an actuator 112. A slit may divide the film structure 111 into two flaps 111Fa and 111Fb opposite to each other. The flap 111Fa/111Fb may include an anchored end and a free end, such that the flap 111Fa/111Fb may be actuated by the actuator 112 to swing upwardly or downwardly. The actuator may include actuating portions 112Ca and 112Cb, which are disposed on the flaps 111Fa and 111Fb, respectively.

The driving circuit 10dvrC, configured to drive the venting device 10vntD, may include nodes N1 and N2. The node N1 is coupled to the actuating portion 112Ca (e.g., a point or an electrode thereof) to ensure a voltage across two electrodes of the actuating portion 112Ca; the node N2 is coupled to the actuating portion 112Cb (e.g., a point or an electrode thereof) to ensure a voltage across two electrodes of the actuating portion 112Cb.

According to FIG. 1 (*a*), when the venting device 10vntD is controlled to open the vent 113vnt, the driving circuit 10dvrC may generate a voltage Vo1 (which is equal to a first voltage $V_{up}$) at the node N1 and generate a voltage Vo2 (which is equal to a second voltage $V_{down}$) at the node N2.

In the present application, Vo1 is used to denote a voltage applied on the actuating portion 112Ca, and Vo2 is used to denote a voltage applied on the actuating portion 112Cb. The first voltage $V_{up}$ represents the voltage which drives the corresponding flap to move upward or toward a positive Z direction. The second voltage $V_{down}$ represents the voltage which drives the corresponding flap to move downward or toward a negative Z direction.

In the embodiment shown in FIG. 1 (*a*), the driving circuit 10dvrC generates the first voltage $V_{up}$ as the voltage Vo1 and the driving circuit 10dvrC generates the second voltage $V_{down}$ as the voltage Vo2.

According to FIG. 1 (*b*), when the venting device is controlled to seal the vent 113vnt, the driving circuit 10dvrC generates the voltage Vo1 (which is equal to a third voltage) at the node N1 and generates the voltage Vo2 (which is equal to the third voltage) at the node N2.

In an embodiment, the third voltage, which may be annotated as $V_{seal}$, represents the voltage which drives the corresponding flap(s) to remain at a flat position parallel to a substrate 114 or base on which the venting device 10vntD is disposed. When the driving circuit 10dvrC generates the third voltage $V_{seal}$ to be both the voltages Vo1 and Vo2, both the flaps 111Fa and 111Fb remain at the flat position. In this case, air leakage passing through the flaps 111Fa and 111Fb is negligible, and the venting device 10vntD is considered as sealed or closed.

In an embodiment, the first voltage V np, the second voltage V down and the third voltage $V_{seal}$ may be 30V, 0V and 15V, respectively, i.e., $V_{up}>V_{seal}>V_{down}$.

In an embodiment, the voltage Vo1 applied to the actuating portion 112Ca is switchable between the first voltage and the third voltage, and the voltage Vo2 applied to the actuating portion 112Cb is switchable between the second voltage and the third voltage, such that the venting device 10vntD can be switched between an open state (e.g., for an airflow channel to be created) and a closed state (e.g., for lowest leakage).

Figure 2:
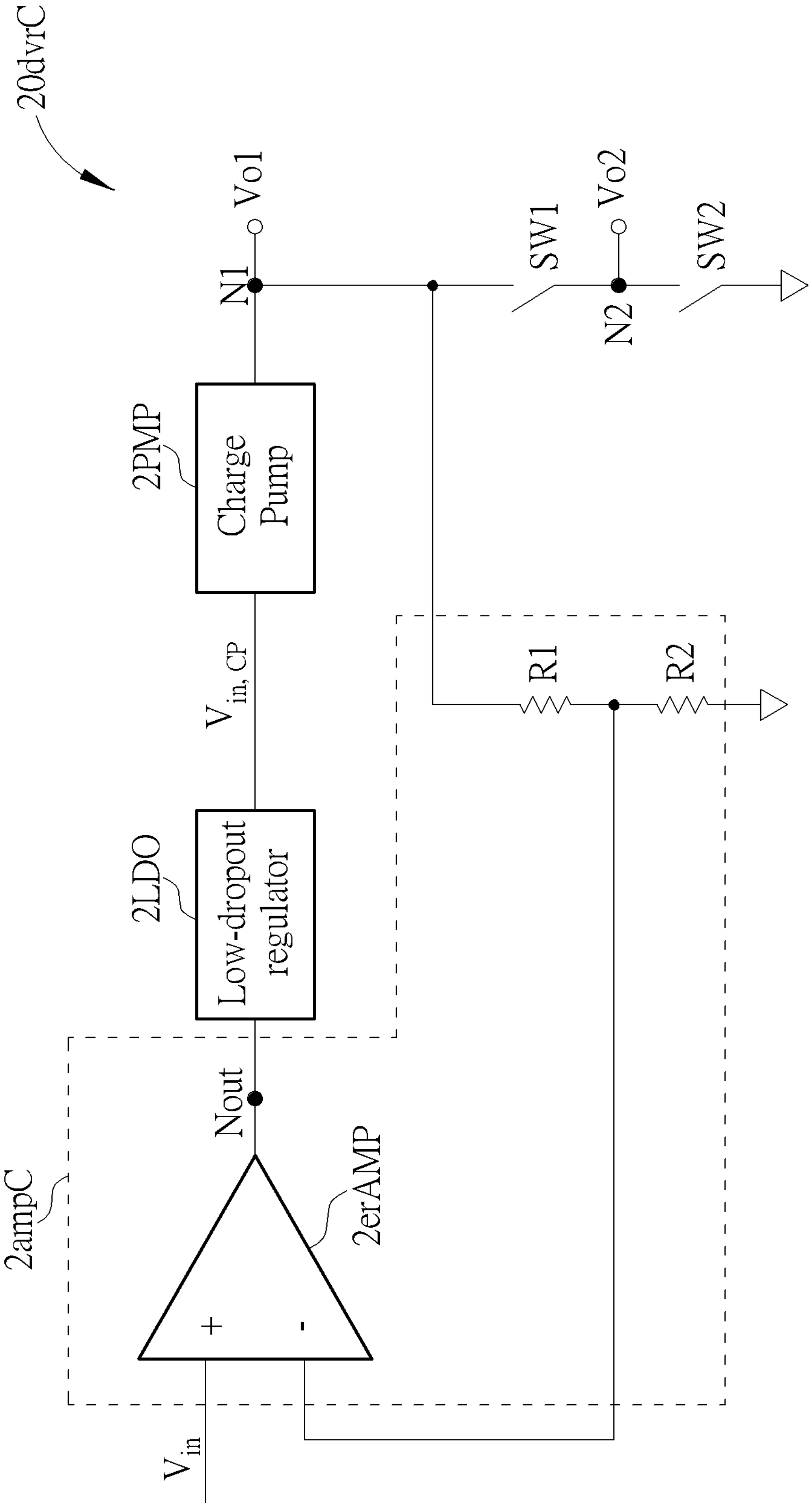
FIG. 2 and FIG. 3 are schematic diagrams of driving circuits according to embodiments of the present application.

FIG. 2 is a schematic diagram of a driving circuit 20dvrC according to an embodiment of the present application. The driving circuit 10dvrC may be implemented by the driving circuit 20dvrC. The driving circuit 20dvrC may include an amplifying circuit 2ampC, a low-dropout regulator (LDO) 2LDO, a charge pump 2PMP, switches SW1 and SW2. The amplifying circuit 2ampC, which has an amplifying output terminal Nout coupled to the node N1, may include an error amplifier 2erAMP, resistors R1 and R2 placed in a (negative) feedback loop that determines the amplifying gain of the amplifying circuit 2ampC.

When the venting device 10vntD is controlled to open the vent 113vnt, the switch SW1 coupled between the nodes N1 and N2 is cutoff. The error amplifier 2erAMP receives an input voltage $V_{in}$ (which is equal to a first input voltage), and the first voltage equals the first input voltage times the amplifying gain. For example, the first voltage and the first input voltage are 30V and 1.2V, respectively, supposing the ratio of the resistor R1 to the resistor R2 is 24. Besides, the switch SW2 coupled between the node N2 and (electrical) ground is conducted, such that the second voltage applied to the node N2 is 0V.

When the venting device 10vntD is controlled to seal the vent 113vnt, the switch SW1 is conducted to connect the node N1 to the node N2, and the switch SW2 is cutoff. The error amplifier 2erAMP receives the input voltage $V_{in}$ (which is equal to a second input voltage), and the third voltage applied to both the nodes N1 and N2 equals the second input voltage times the amplifying gain. For example, the third voltage and the second input voltage are 15V and 0.6V, respectively, supposing the ratio of the resistor R1 to the resistor R2 is 24.

Note that, the driving circuit 20dvrC comprising the resistors R1 and R2 and having the amplifying gain is for illustrative purpose, which is not limited thereto. The driving circuit may comprise other kind of passive component (e.g., capacitor) to have the amplifying gain, which is also within the scope of the present application.

In other words, the driving circuit 20dvrC facilitates a dynamic vent. As shown in FIG. 1, the space within the wearable sound device 10 may be partitioned into volumes 130chmF and 130chmB. The volume 130chmF generally may represent a volume within the wearable sound device 10 which is connected to or to be connected to an ear canal, and the volume 130chmB may represent a volume within the wearable sound device 10 which is connected to or to be connected to an ambient environment of the wearable sound device 10. When the vent 113vnt is closed/sealed, the volumes 130chmF and 130chmB are barely connected, which may avoid significant drops in sound pressure level (SPL) at lower frequencies and improve listening experience. When the vent 113vnt is formed within the venting device 10vntD, the volumes 130chmF and 130chmB are connected via the vent 113vnt to permit sound/air to vent from one side to another, thereby releasing pressure caused by occlusion effect.

In the embodiment shown in FIG. 2, the LDO 2LDO is able to regulate its output voltage $V_{in,CP}$ at small difference between its input voltage and the output voltage $V_{in,CP}$, which is not limited thereto. The charge pump 2PMP is configured to raise voltage, which is not limited thereto as well.

Note that, reliability may become a concern after the flap 111Fa consistently maintains a particular deformation (because the actuating portion 112Ca is subjected to a constant/fixed voltage) for a long time. If the flap bends and alters between upward (as 111Fa in FIG. 1 (*a*)) and downward (as 111Fb in FIG. 1 (*a*)) while the venting device 10vntD operates, lifetime of the venting device 10vntD may be enhanced.

Figure 3:
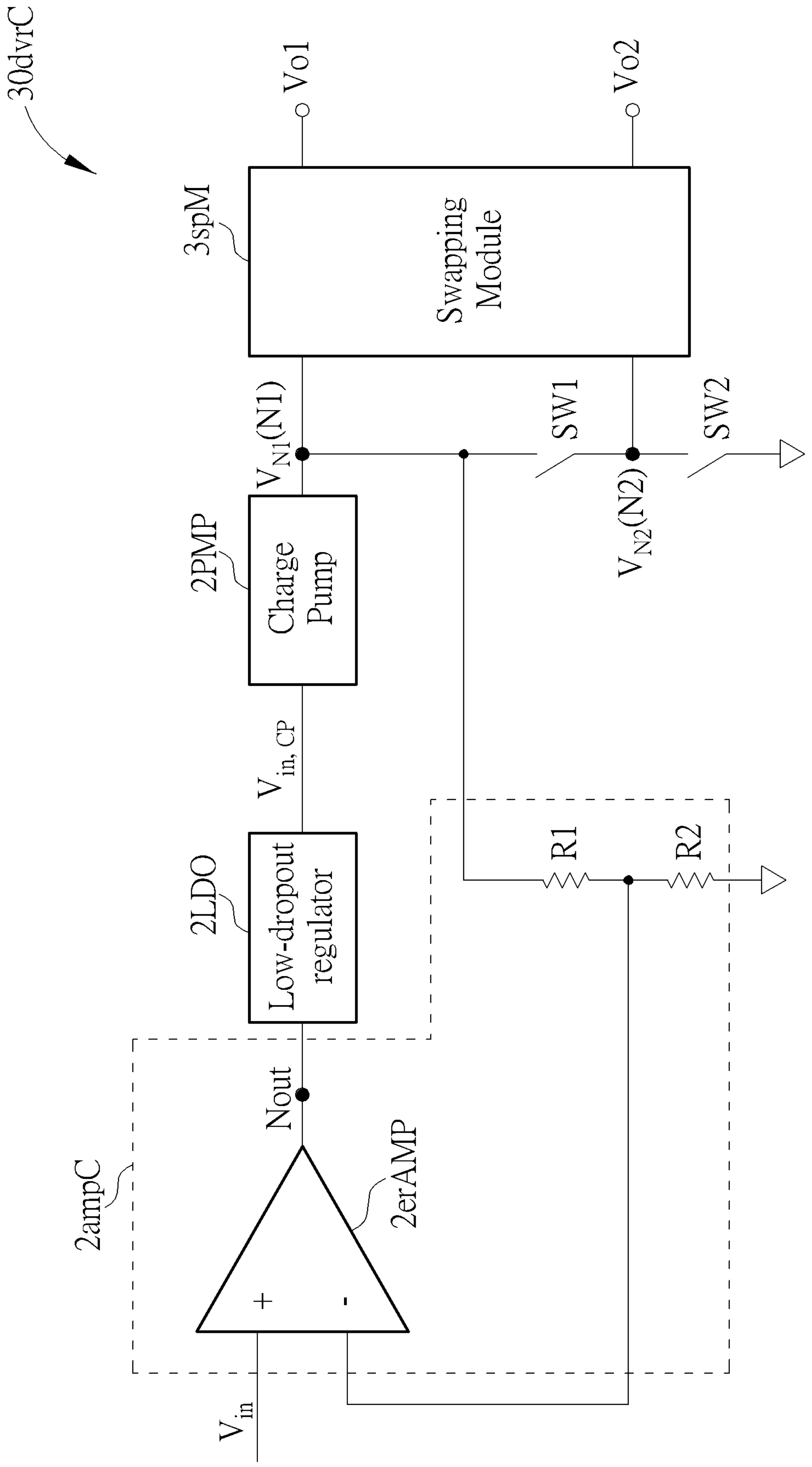

For example, FIG. 3 is a schematic diagram of a driving circuit 30dvrC according to an embodiment of the present application. The driving circuit 10dvrC may be implemented by the driving circuit 30dvrC. Different from driving circuit 20dvrC, the driving circuit 30dvrC may further include a swapping module 3spM, which is coupled between the nodes N1, N2, the actuating portions 112Ca and 112Cb, for longer lifetime.

When the venting device 10vntD is controlled to open the vent 113vnt, the swapping module 3spM is configured to swap the first voltage $V_{up}$ between the actuating portion 112Ca and the actuating portion 112Cb and to swap the second voltage $V_{down}$ between the actuating portion 112Cb and the actuating portion 112Ca (e.g., periodically or randomly). In this way, the free end of the flap 111Fa and the free end of the flap 111Fb are far enough to create the vent 113vnt, while the voltage Vo1/Vo2 applied to the actuating portion 112Ca/112Cb is alternated between the first voltage and the second voltage to change the deformation of the actuating portion 112Ca/112Cb, thereby increasing lifetime.

When the venting device 10vntD is controlled to seal the vent 113vnt, the swapping module 3spM is configured to apply the third voltage to the actuating portions 112Ca and 112Cb. For example, the node N1 may be coupled/connected to the actuating portion 112Ca (illustrated using the voltage Vo1), and the node N2 may be coupled/connected to the actuating portion 112Cb (illustrated using the voltage Vo2).

In other words, in a first phase/period, the swapping module 3spM may deliver a voltage at the node N1, denoted as $V_{N1}$, to the actuating portion 112Ca as Vo1 and deliver a voltage at the node N2, denoted as $V_{N2}$, to the actuating portion 112Cb as Vo2; in a second phase/period, the swapping module 3spM may deliver the voltage $V_{N1}$ to the actuating portion 112Cb as Vo2 and deliver the voltage $V_{N2}$ to the actuating portion 112Ca as Vo1.

Figure 4:
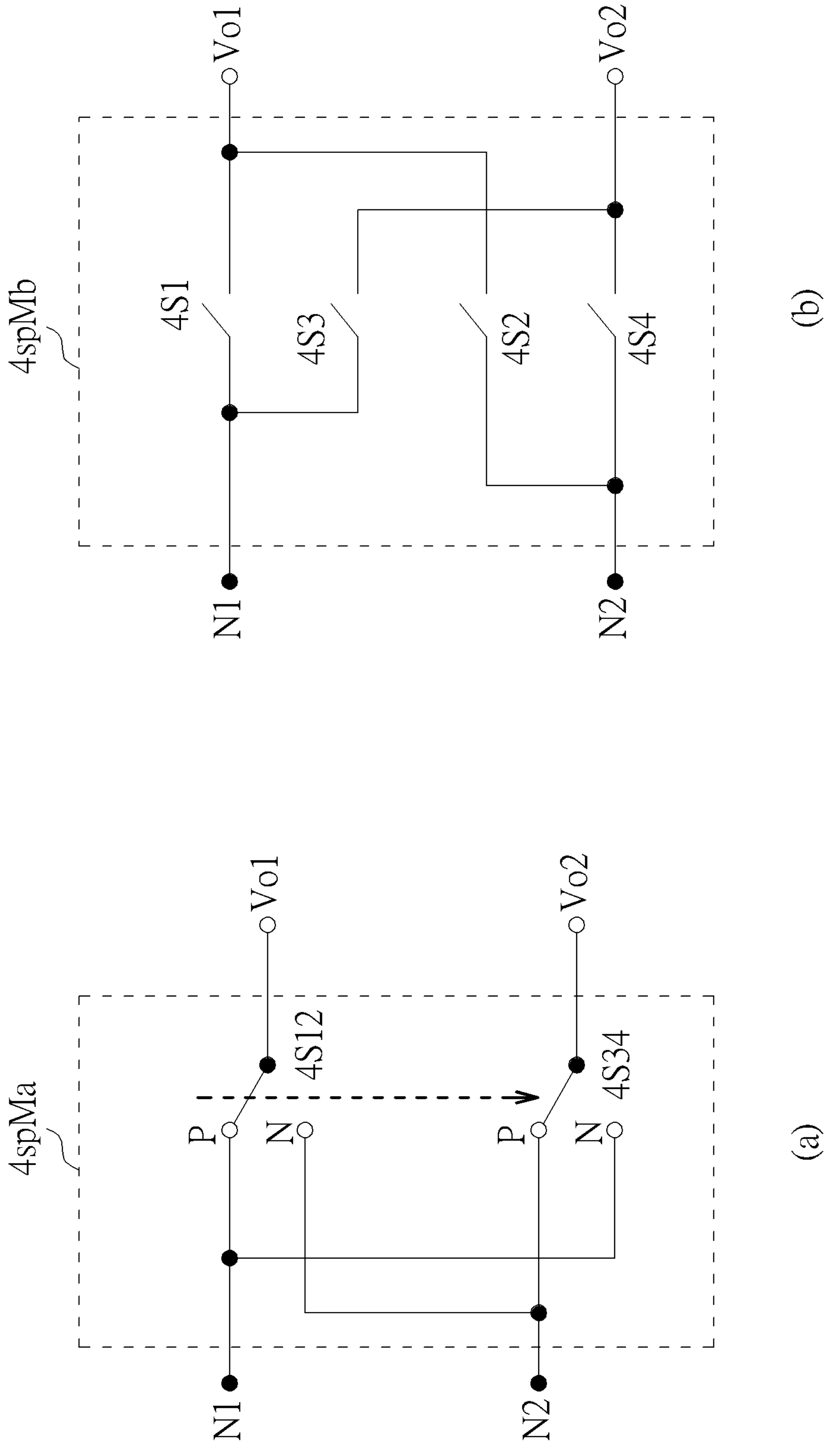
FIG. 4 to FIG. 6 are schematic diagrams of swapping modules according to embodiments of the present application.

FIG. 4 is a schematic diagram of swapping modules 4spMa and 4spMb according to embodiments of the present application. The swapping module 3spM may be implemented by the swapping module 4spMa or 4spMb.

FIG. 4 (*a*) illustrates the swapping module 4spMa, which may include a switch 4S12 (configured to selectively couple the actuating portion 112Ca to the first voltage or the second voltage) and a switch 4S34 (configured to selectively couple the actuating portion 112Cb to the second voltage or the first voltage). In other words, the switches 4S12 and 4S34 (e.g., double pole double throw switches) may be controlled by a control signal, such that the actuating portions 112Ca and 112Cb are switched to the nodes N1 and N2, respectively, at the same time, or the actuating portions 112Ca and 112Cb are switched to the nodes N2 and N1, respectively, at the same time.

FIG. 4 (*b*) illustrates the swapping module 4spMb, which may include a switch 4S1 (coupled between the actuating portion 112Ca and the node N1), a switch 4S2 (coupled between the actuating portion 112Ca and the node N2), a switch 4S3 (coupled between the actuating portion 112Cb and the node N1), and a switch 4S4 (coupled between the actuating portion 112Cb and the node N2). Within a period during which the first voltage is applied on the actuating portion 112Ca and the second voltage is applied on the actuating portion 112Cb to open the vent 113vnt, the switches 4S1 and 4S4 are conducted, and the switches 4S2 and 4S3 are cutoff. Within another period during which the second voltage is applied on the actuating portion 112Ca and the first voltage is applied on the actuating portion 112Cb to open the vent 113vnt, the switches 4S2 and 4S3 are conducted, and the switches 4S1 and 4S4 are cutoff.

Figure 5:
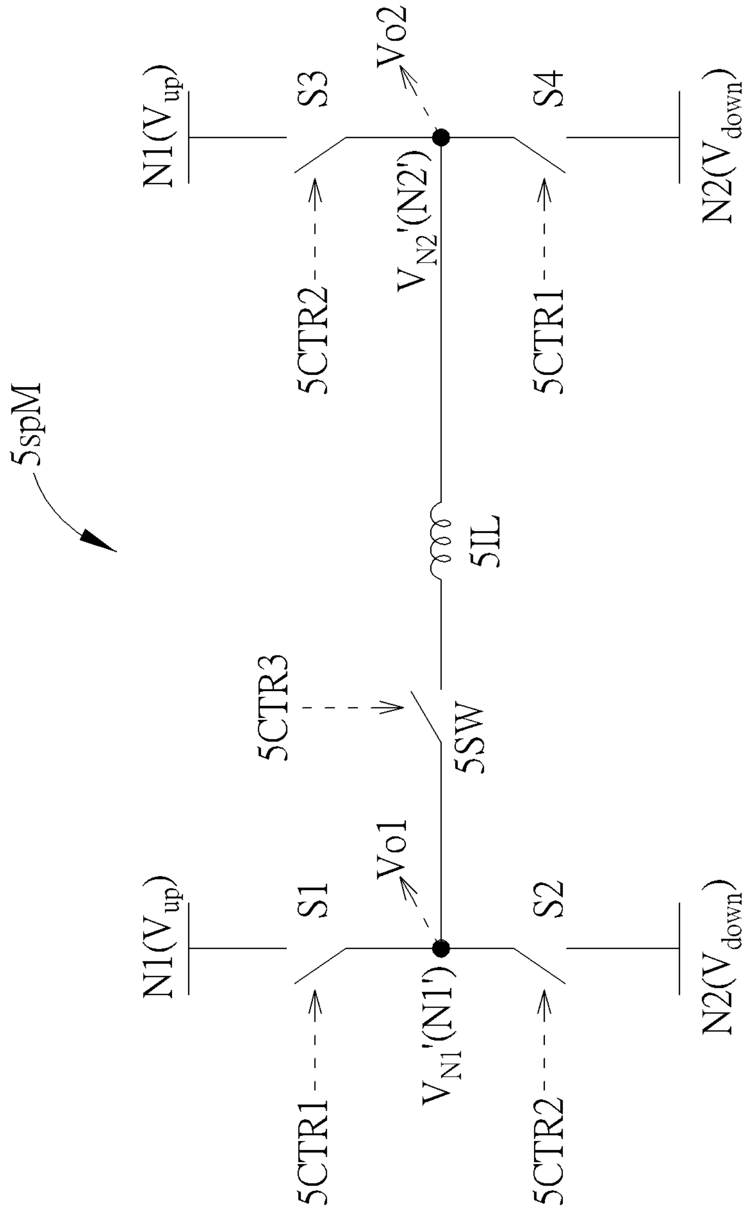

A driving circuit may leverage properties of an actuating portion (e.g., capacitive property) to save power via energy recycling. FIG. 5 is a schematic diagram of a swapping module according to an embodiment of the present application. The swapping module 3spM may be implemented by the swapping module 5spM, which may include switches S1-S4, an inductor and a switching module 5SW.

The switches S1 and S2 may be controlled by control signals 5CTR1 and 5CTR2, respectively, such that a node N1', which is coupled to the actuating portion 112Ca (e.g., its electrode), would deliver the first voltage $V_{up}$ at the node N1 or the second voltage $V_{down}$ at the node N2 to the actuating portion 112Ca. The switches S3 and S4 may be controlled by the control signals 5CTR2 and 5CTR1, respectively, such that a node N2', which is coupled to the actuating portion 112Cb (e.g., its electrode), would deliver the second voltage $V_{down}$ or the first voltage $V_{up}$ to the actuating portion 112Cb.

The switching module 5SW controlled by a control signal 5CTR3 is able to draw current not only from the node N2' to the node N1' but also from the node N1' to the node N2'. Because of swapping activities of the swapping module 5spM, the energy stored in the actuating portion 112Ca or 112Cb would be mostly recycled (and reused by the actuating portion 112Cb or 112Ca) to reduce power consumption.

Figure 6:
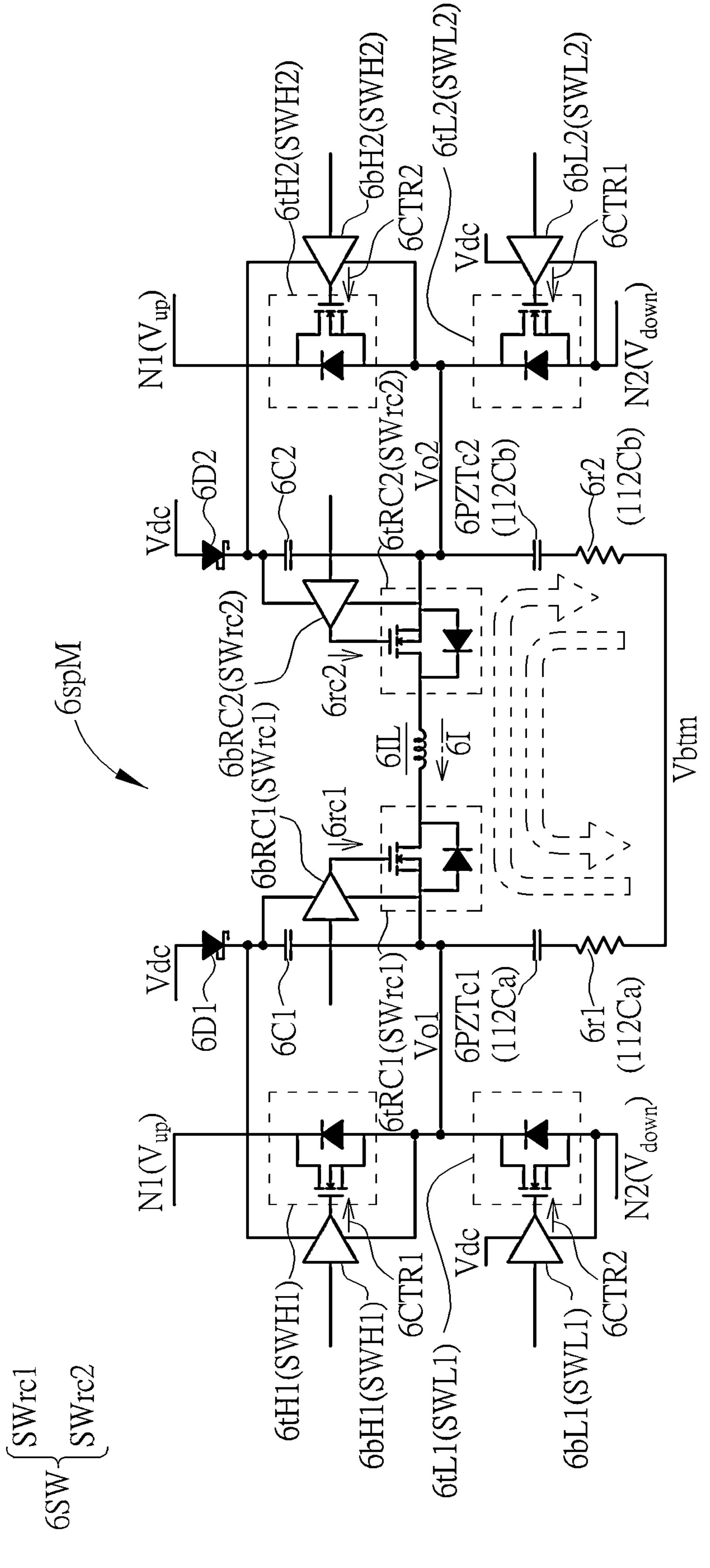

FIG. 6 is a schematic diagram of a swapping module 6spM according to an embodiment of the present application. The swapping module 3spM may be implemented by the swapping module 6spM, which may include switches SWH1, SWL1, SWH2, SWL2, an inductor 61L, and a switching module 6SW. The switches SWH1, SWL1, SWH2, and SWL2 may include buffers 6*b*H1, 6*b*L1, 6*b*H2, 6*b*L2, transistors 6*t*H1, 6*t*L1, 6*t*H2, and 6*t*L2, respectively. The switching module 6SW may include switches SWrc1 and SWrc2, which may include buffers 6*b*RC1, 6*b*RC2, transistors 6*t*RC1, and 6*t*RC2.

Figure 7:
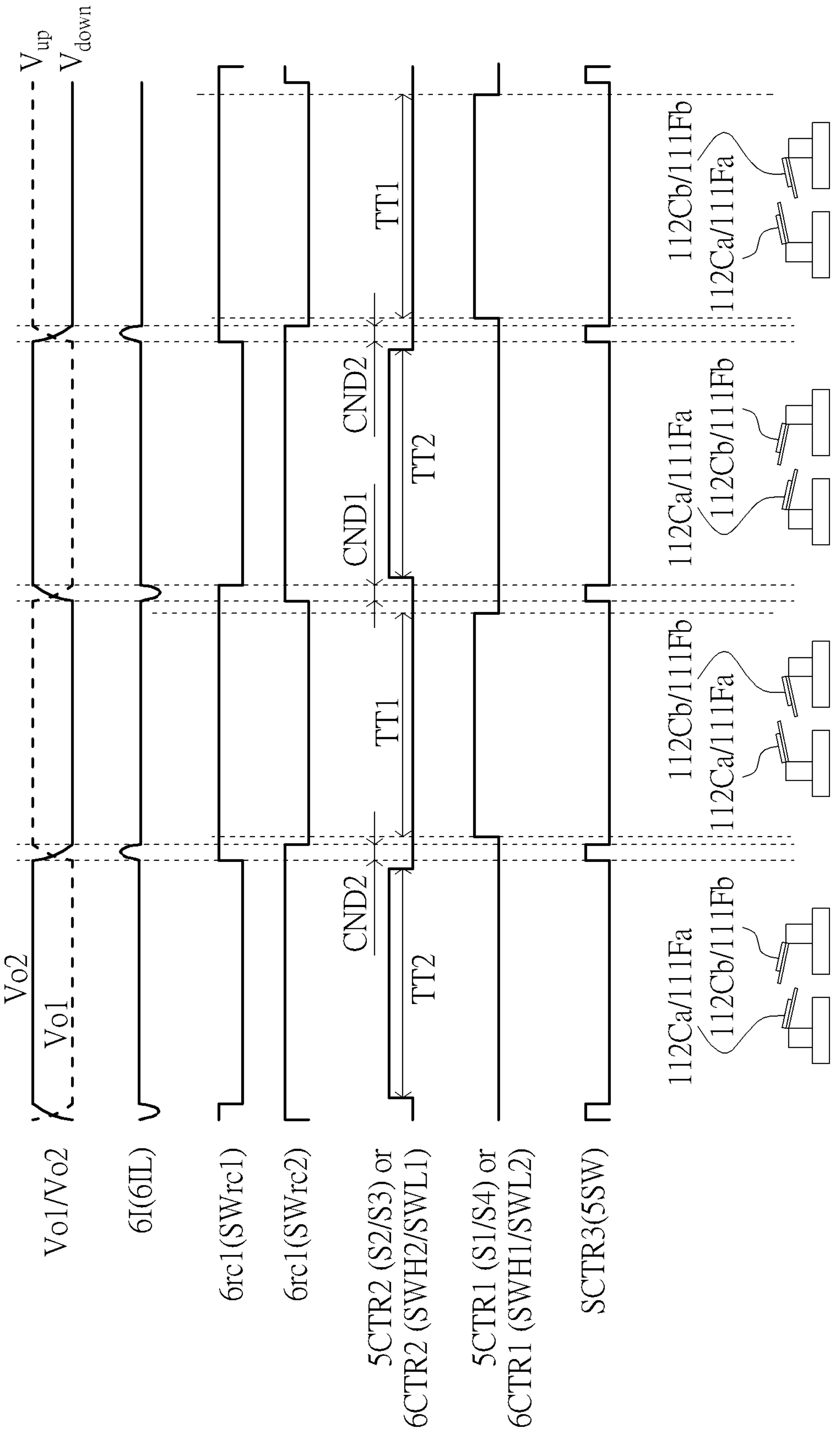
FIG. 7 is a timing diagram of the voltages, a current, control signals for the swapping module shown in FIG. 6.

FIG. 7 is a timing diagram of the voltages Vo1, Vo2, a current 6I, control signals 6*rc*1, 6*rc*2, 6CTR1 (or 5CTR1), 6CTR2 (or 5CTR2), and 5CTR3 for the swapping module 6spM shown in FIG. 6 (or the swapping module 5spM shown in FIG. 5). For illustration purpose, a switch (e.g., SWH1) is conduced when the corresponding control signal (e.g., 6CTR1) is in a high state (e.g., logic “1”), and is non-conducted or cutoff when the corresponding control signal is in a low state (e.g., logic “0”).

Within a period TT1 during which the first voltage $V_{up}$ is applied on the actuating portion 112Ca and the second voltage $V_{down}$ is applied on the actuating portion 112Cb to open the vent 113vnt, the switches SWH1 and SWL2 are conducted (to increase a voltage $V_{N1'}$ at the node N1' to the first voltage $V_{up}$ and decrease a voltage $V_{N2'}$ at the node N2' to the second voltage $V_{down}$), and the switches SWL1, SWH2 are cutoff. In the period TT1, the driving circuit provides $V_{N1'}/V_{up}$ as Vo1 and provides $V_{N2'}/V_{down}$ as Vo2. As a result, the free end of the flap 111Fa having swung upwardly is higher than the anchored ends of the flaps 111Fa and 111Fb, and the free end of the flap 111Fb having swung downwardly is lower than the anchored ends of the flaps 111Fa and 111Fb, as shown in FIG. 7. Besides, the switching module 6SW is cutoff within the period TT1 because the switch SWrc2 is cutoff.

Within a period CND1 (serving as a third period) between the period TT1 (serving as a first period) and the period TT2 (serving as a second period), the switches SWH1, SWL1, SWH2, and SWL2 are cutoff, and the switches SWrc1 and SWrc2 are conducted. The current 6I flowing through the inductor 6IL keeps decreasing (i.e., in the opposite direction to the nominated positive direction in FIG. 6) until the voltage Vo1 applied to the actuating portion 112Ca equals the voltage Vo2 applied to the actuating portion 112Cb. Then the current 6I starts increasing until it reaches 0. By virtue of the current 6I, electric charges stored in a capacitor 6PZTc1 (formed between a bottom electrode having a voltage Vbtm and a top electrode of the actuating portion 112Ca) may be transferred to a capacitor 6PZTc2 (formed between a bottom electrode having the voltage Vbtm and a top electrode of the actuating portion 112Cb), resulting in the voltages Vo1 and Vo2 being swapped effectively. (In an embodiment, the voltage Vbtm may be grounded.) As the voltage Vo1 drops from the first voltage $V_{up}$ toward the second voltage $V_{down}$ and the voltage Vo2 ramps upward from the second voltage $V_{down}$ toward the first voltage $V_{up}$, the flap 111Fa may swing downwardly and the flap 111Fb may swing upwardly.

Within a period TT2 during which the second voltage $V_{down}$ is applied on the actuating portion 112Ca and the first voltage $V_{up}$ is applied on the actuating portion 112Cb to open the vent 113vnt, the switches SWL1 and SWH2 are conducted (to decrease the voltage $V_{N1'}$ to the second voltage $V_{down}$ and increase the voltage $V_{N2'}$ to the first voltage $V_{up}$), and the switches SWH1, SWL2 are cutoff. In the period TT2, the driving circuit provides $V_{N1'}/V_{up}$ as Vo2 and provides $V_{N2'}/V_{down}$ as Vo1. As a result, the free end of the flap 111Fa having swung downwardly is lower than the anchored ends of the flaps 111Fa and 111Fb, and the free end of the flap 111Fb having swung upwardly is higher than the anchored ends of the flaps 111Fa and 111Fb, as shown in FIG. 7. Besides, the switching module 6SW is cutoff within the period TT2 because the switch SWrc1 is cutoff.

Within a period CND2 (serving as the third period) between the periods TT2 and TT1, the switches SWH1, SWL1, SWH2, and SWL2 are cutoff, and the switches SWrc1 and SWrc2 are conducted. The current 6I flowing through the inductor 6IL keeps increasing until the voltage Vo1 equals the voltage Vo2. Then the current 6I starts decreasing until it reaches 0. By virtue of the current 6I, electric charges stored in the capacitor 6PZTc2 of the actuating portion 112Cb may be transferred to the capacitor 6PZTc1 of the actuating portion 112Ca, resulting in the voltages Vo1 and Vo2 being swapped effectively. As the voltage Vo1 ramps upward from the second voltage $V_{down}$ toward the first voltage $V_{up}$ and the voltage Vo2 drops from the first voltage $V_{up}$ toward the second voltage $V_{down}$, the flap 111Fa may swing upwardly and the flap 111Fb may swing downwardly.

Specifically, at the beginning of the period CND2, due to the voltage difference between the voltages Vo1 and Vo2, the inductor 6IL would conduct the current 6I from the actuating portion 112Cb (e.g., its top electrode) to the actuating portion 112Ca (e.g., its top electrode) and also play a role to resist current variation of the current 6I. Besides, the capacitors 6PZTc1, 6PZTc2, the inductor 6IL, a resistor 6*r*1 of the actuating portion 112Ca, and a resistor 6*r*2 of the actuating portion 112Cb may be viewed as a RLC circuit. In an embodiment, the RLC circuit may form a RLC oscillator, which may be underdamped, such that the current 6I takes a surge upwards, almost taking on a shape similar to the first hump of a sine wave, after the switches SWrc1 and SWrc2 have been conducted. As a result, the current 6I from the actuating portion 112Cb to the actuating portion 112Ca would be drawn, which is equivalent to the amount of electrons/charges is transferred/removed from the capacitor 6PZTc2 to the capacitor 6PZTc1 during/after the period CND2.

By the same rationale, during/after the period CND1, the amount of electronics/charges would be (more or less) transferred back to the capacitor 6PZTc2 via the switching module 6SW and the inductor 61L. Thereby, the energy stored in the actuating portion 112Ca or 112Cb (e.g., the capacitor 6PZTc1 or 6PZTc2) would be mostly recycled/reused during/after the period CND1 or CND2, such that power consumption due to swapping activities of the swapping module 6spM is significantly reduced.

As shown in FIG. 7, the starting time of the period CND1/CND2 is a while after the end time of the period TT1/TT2, the end time of the period CND1/CND2 is a while after the starting time of the period TT2/TT1. Alternatively, the starting time of the period CND1/CND2 is coincident with the end time of the period TT1/TT2, the end time of the period CND1/CND2 is coincident with the starting time of the period TT2/TT1.

In an embodiment, the swapping frequency of the switching module 6SW may be set to a low value (e.g., below 10 Hertz) to reduce power consumption or minimize swapping acoustic noise (because human listening perception exhibits low sensitivity to low frequency), which is not limited thereto. The differential/antisymmetric movement of the flaps 111Fa and 111Fb may facilitate a net zero volume displacement, which may minimize swapping acoustic noise as well.

Details of energy recycling principles of the swapping modules 5spM and 6spM may be referred to U.S. application Ser. No. 17/133,655, which is incorporated herein by reference.

Figure 8:
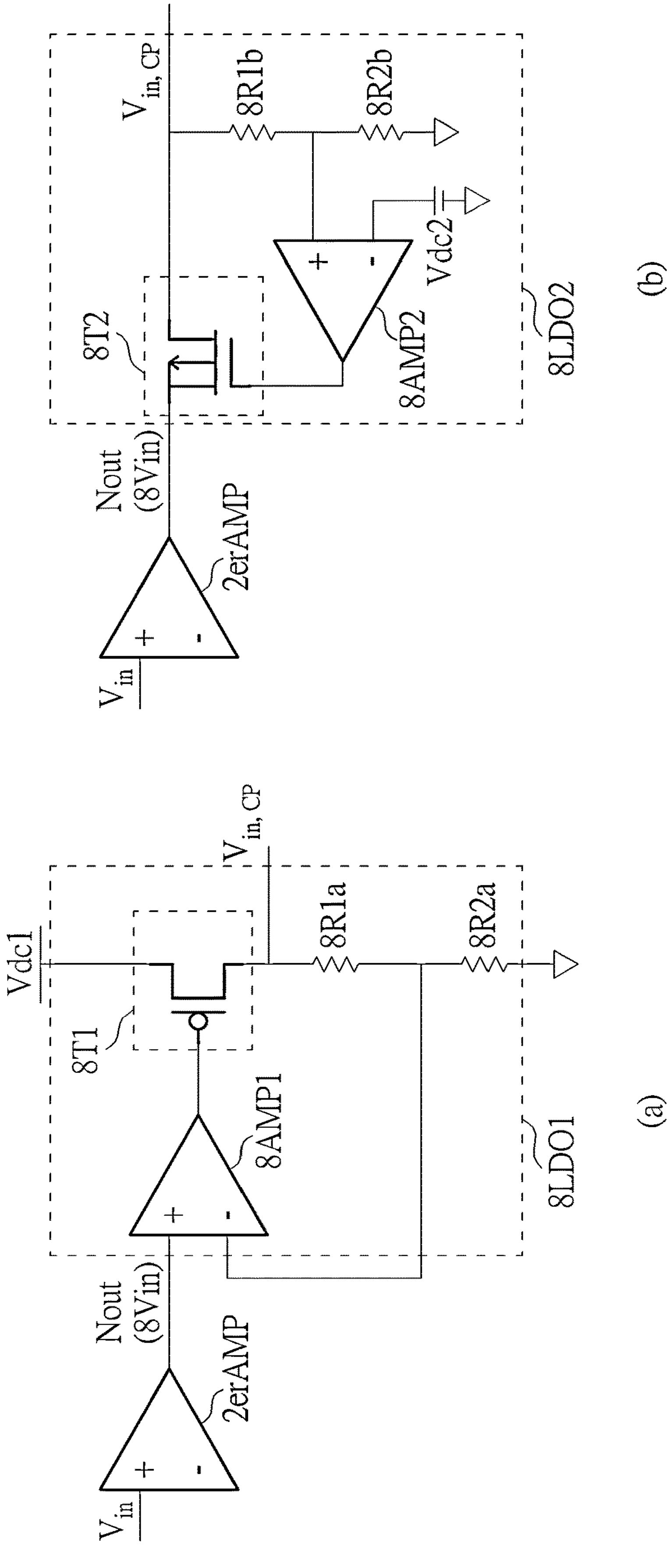
FIG. 8 is a schematic diagram of LDOs according to embodiments of the present application.

FIG. 8 is a schematic diagram of LDOs 8LDO1 and 8LDO2 according to embodiments of the present application. The LDO 2LDO may be implemented by the LDO 8LDO1 or 8LDO2.

FIG. 8 (*a*) illustrates the LDO 8LDO1, which may include resistors 8R1*a*, 8R2*a*, an amplifier 8AMP1, and a transistor 8T1. One input terminal of the amplifier 8AMP1 monitors the fraction of its output voltage $V_{in,CP}$ determined by the ratio of the resistor 8R1*a* to the resistor 8R2*a*. If the output voltage $V_{in,CP}$ differs from a voltage 8Vin at the other input terminal of the amplifier 8AMP1 (or the amplifying output terminal Nout), the drive to the transistor 8T1 changes to keep the output voltage $V_{in,CP}$ constant.

FIG. 8 (*b*) illustrates the LDO 8LDO2, which may include resistors 8R1*b*, 8R2*b*, an amplifier 8AMP2, and a transistor 8T2. One input terminal of the amplifier 8AMP2 monitors the fraction of its output voltage $V_{in,CP}$ determined by the ratio of the resistor 8R1*b* to the resistor 8R2*b*. If the output voltage $V_{in,CP}$ differs from a stable reference voltage Vdc2 at the other input terminal of the amplifier 8AMP1, the drive to the transistor 8T2 changes to keep the output voltage $V_{in,CP}$ constant.

Figure 9:
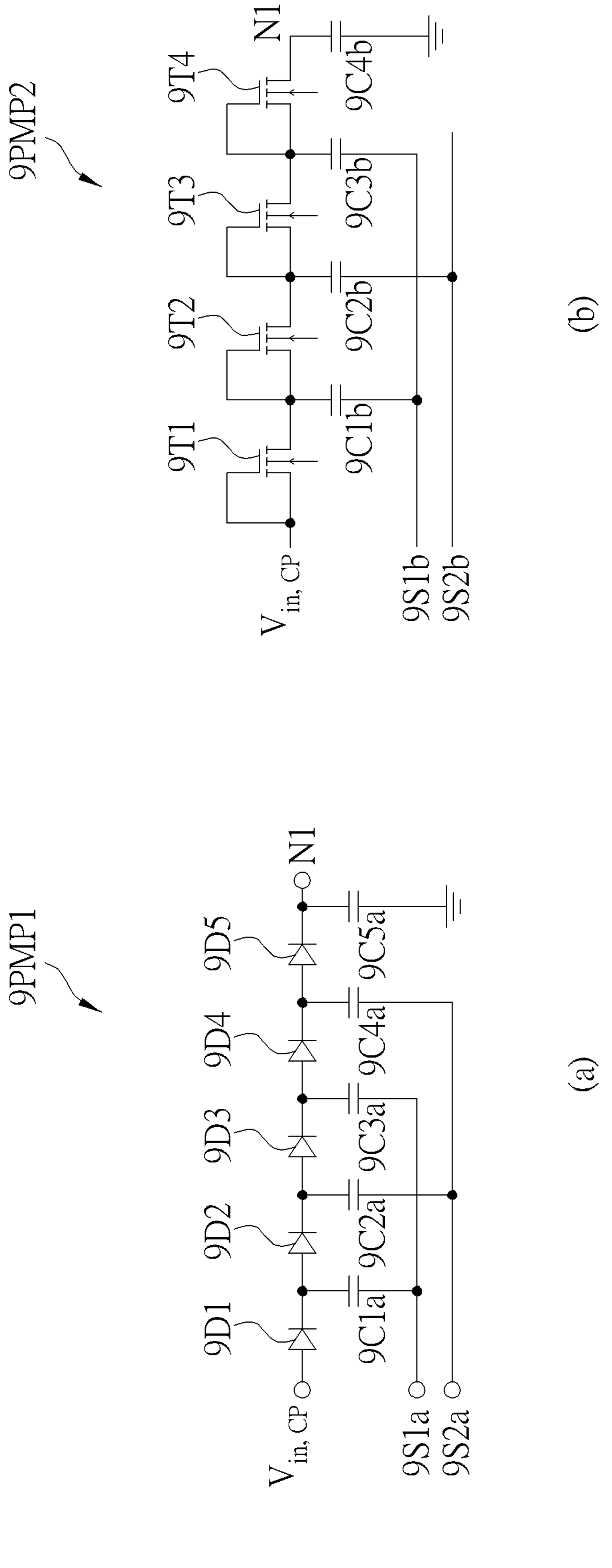
FIG. 9 is a schematic diagram of charge pumps according to embodiments of the present application.

FIG. 9 is a schematic diagram of charge pumps 9PMP1 and 9PMP2 according to embodiments of the present application. The charge pump 2PMP may be implemented by the charge pump 9PMP1, or 9PMP2, or a Dickson charge pump.

In FIG. 9, (a) illustrates the charge pump 9PMP1, which may include capacitors 9C1*a*-9C5*a* for charge storage to raise voltage and diodes 9D1-9D5 to transfer charges between capacitors 9C1*a*-9C5*a*, and requires a feed of signals 9S1*a* and 9S2*a*, which are the opposite of one another.

FIG. 9 (*b*) illustrates the charge pump 9PMP2, which may include capacitors 9C1*b*-9C4*b* for charge storage to raise voltage and transistor 9T1-9T4 to transfer charges between capacitors 9C1*b*-9C4*b*, and requires a feed of signals 9S1*b* and 9S2*b*, which are the opposite of one another.

Furthermore, to increase lifetime, in an embodiment, the input to the actuating portion 112Ca or 112Cb (e.g., an electrode or a point of the actuating portion 112Ca) may be a superposition/combination of an alternating current (AC) waveform and a direct current (DC) waveform.

For example, referring back to FIG. 1 (*a*), when the venting device 10vntD is controlled to open the vent 113vnt, the driving circuit 10dvrC may generate a first signal (which may include the first voltage and a first AC component) at the node N1 and generate a second signal (which may include the second voltage and a second AC component) at the node N2 to change the input to the actuating portion 112Ca or 112Cb with time (e.g., (a) periodically or randomly). In an embodiment, the first and second AC components may be the opposite of one another, such that a combination of the first and second AC components is zero, which may generate a net zero volume displacement to minimize acoustic output caused by the first and second AC components. The first and second AC components may be smaller than the average of the first and second voltages. The larger the first or second AC component, the larger the average of the first and second voltages may be.

Figure 10:
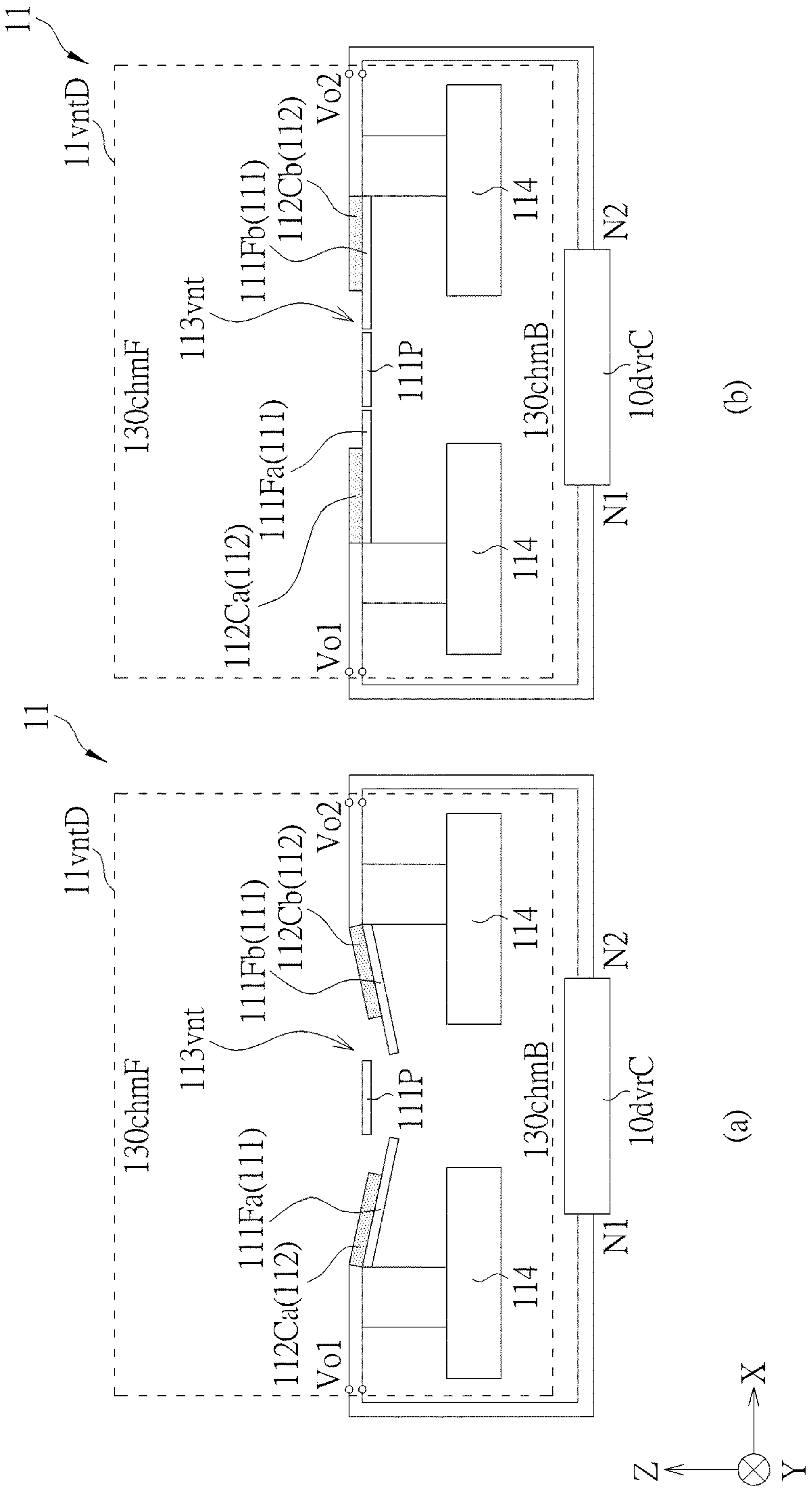
FIG. 10 is a schematic diagram of a wearable sound device according to embodiments of the present application.

Furthermore, FIG. 10 provides another scheme to provide longevity or long lifetime. In FIG. 10, the venting device 11vntD further comprise a portion 111P disposed between the free ends of the flaps 111Fa and 111Fb, in order to lengthen a distance between the free ends of the flaps 111Fa and 111Fb.

When the venting device 11vntD is controlled to open the vent 113vnt, the voltages Vo1 and Vo2 may be $V_{down}$ (e.g., 0V (grounded)) or floated, as shown in FIG. 10 (*a*). Thus, no electrical stress is applied on the venting device 11vntD and lifetime maybe enhanced.

On the other hand, when the venting device 11vntD is controlled to close the vent 113vnt, the voltage Vo1 may be the third voltage $V_{seal}$ plus a third AC component and the voltage Vo2 may be the third voltage $V_{seal}$ plus a fourth AC component. In other words, when the venting device 11vntD is controlled to close the vent 113vnt as shown in FIG. 10 (*b*), the driving circuit 10dvrC may generate a third signal (which may include the third voltage $V_{seal}$ and the third AC component) at the node N1 and generate a fourth signal (which may include the third voltage $V_{seal}$ and the fourth AC component) at the node N2. The third and fourth AC components may be the opposite of one another, such that a combination of the third and fourth AC components is zero, which may generate a net zero volume displacement to minimize acoustic output caused by the third and fourth AC components. Alternatively, the waveform of the third AC component is identical to that of the fourth AC component. The third and fourth AC components may be relatively small compared to the third voltage, such that the vent 113vnt is substantially sealed/closed. The larger the third or fourth AC component, the larger the third voltage may be. The amplitude of the third or fourth AC component may be different from that of the first or second AC component.

Note that, an alternative of applying $V_{down}$ (e.g., 0V) on the actuating portion is making the actuating portion floated (i.e., applying no voltage on the actuating portion). In this case, the free end of the flap may hang down and below its anchored end. Making the actuating portion floated would achieve similar effect as applying $V_{down}$ on the actuating portion, and even save power.

In the context of the present application, an AC waveform may encompass a waveform that is not of a DC nature. Therefore, any waveform that is not purely DC is considered an AC waveform. The term "voltage" may refer to a DC waveform or a waveform that time-invariant; the term "signal" may refer to an AC waveform or a waveform that varies with time.

In an embodiment, an application processor may be configured to process input from sensor(s) and issue command(s) to control the driving circuit 10dvrC, such that the first or third voltage is applied to the node N1 and the second or third voltage is applied to the node N2 to open or seal the vent 113vnt. For example, the application processor may be configured to turn on/off the switch SW1 or SW2. The sensor(s) may be a feedforward microphone configured to detect external noise, a feedback microphone configured to detect acoustic sound due to occlusion effect, or a motion sensor configured to detect acoustic sound due to body movement (e.g., jogging).

Any mechanism that can create or obstruct a vent can be utilized as the wearable sound device 10 of the present invention. Details or modifications of a wearable sound device, a venting device, or a driving circuit are disclosed in U.S. application Ser. No. 16/920,384, Ser. No. 17/008,580, Ser. No. 17/133,655, Ser. No. 17/842,810, Ser. No. 17/344,980, Ser. No. 17/344,983, Ser. No. 17/720,333, Ser. No. 18/048,852, Ser. No. 18/172,346, and Ser. No. 18/303,599, the disclosure of which is hereby incorporated by reference herein in its entirety and made a part of this specification.

The use of ordinal terms such as "first" and "second" does not by itself imply any priority, precedence, or order of one element over another, the chronological sequence in which acts of a method are performed, or the necessity for all the elements to be exist at the same time, but these terms are simply used as labels to distinguish one element having a certain name from another element having the same name. The technical features described in the following embodiments may be mixed or combined in various ways as long as there are no conflicts between them.

To sum up, a driving circuit is provided to open a vent or seal a vent of a venting device, leading to a reduction in occlusion effect. A swapping module of a driving circuit configured to swap the first voltage from a first actuating portion to a second actuating portion and to swap the second voltage from the second actuating portion to the first actuating portion (simultaneously) may increase lifetime of a venting device. By harnessing properties of a venting device, a swapping module of a driving circuit may be sophisticatedly designed to recycle energy and reduce power consumption. A driving circuit, which outputs a signal including a (DC) voltage and an AC component to a venting device, may increase lifetime of the venting device as well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit, configured to drive a venting device, the driving circuit comprising:

a first node and a second node; and an amplifying circuit, comprising an amplifying output terminal coupled to the first node;

wherein the venting device comprises a film structure and an actuator;

wherein the film structure comprises a first flap and a second flap;

wherein the actuator comprises a first actuating portion disposed on the first flap and a second actuating portion disposed on the second flap;

wherein the first node is coupled to the first actuating portion and the second node is coupled to the second actuating portion;

wherein the venting device is configured to be controlled to open a vent or seal the vent;

wherein the driving circuit generates a first voltage at the first node and generates a second voltage at the second node, in order to open the vent;

wherein the driving circuit generates a third voltage at both the first node and the second node, in order to seal the vent;

wherein the first voltage is larger than the third voltage, and the third voltage is larger than the second voltage.

2. The driving circuit of claim 1, wherein the amplifying circuit comprises an error amplifier;

wherein the amplifying circuit has an amplifying gain.

3. The driving circuit of claim 2, wherein when the venting device is controlled to open the vent, the error amplifier receives a first input voltage, and the first voltage is the first input voltage times the amplifying gain.

4. The driving circuit of claim 3, comprising a switch coupled between the first node and the second node;

wherein when the venting device is controlled to open the vent, the switch is cutoff.

5. The driving circuit of claim 2, wherein when the venting device is controlled to seal the vent, the error amplifier receives a second input voltage, and the third voltage is the second input voltage times the amplifying gain.

6. The driving circuit of claim 5, comprising a switch coupled between the first node and the second node;

wherein when the venting device is controlled to seal the vent, the switch is conducted.

7. The driving circuit of claim 2, comprising a low-dropout regulator, coupled between the error amplifier and the first node.

8. The driving circuit of claim 2, comprising a charge pump, coupled between the error amplifier and the first node.

9. The driving circuit of claim 1, further comprising:

a swapping module;

wherein the swapping module is coupled between the first actuating portion and the second actuating portion;

wherein the swapping module is configured to swap the first voltage from the first actuating portion to the second actuating portion and to swap the second voltage from the second actuating portion to the first actuating portion.

10. The driving circuit of claim 9, wherein the swapping module comprises a first switch, a second switch, a third switch and a fourth switch;

wherein the first switch and the second switch are coupled to the first actuating portion;

wherein the third switch and the fourth switch are coupled to the second actuating portion.

11. The driving circuit of claim 10, wherein the swapping module comprises an inductor and a switching module;

wherein the inductor and the switching module are coupled between the first actuating portion and the second actuating portion.

12. The driving circuit of claim 11, wherein within a first period during which the first voltage is applied on the first actuating portion and the second voltage is applied on the second actuating portion, the first switch and the fourth switch are conducted, the second switch and the third switch are cutoff, and the switching module is cutoff;

wherein within a second period during which the second voltage is applied on the first actuating portion and the first voltage is applied on the second actuating portion, the second switch and the third switch are conducted, the first switch and the fourth switch are cutoff, and the switching module is cutoff;

wherein within a third period between the first period and the second period, the first switch, the second switch, the third switch and the fourth switch are cutoff and the switching module is conducted.

13. The driving circuit of claim 11, wherein the switching module comprises a fifth switch and a sixth switch;

wherein the fifth switch is coupled between the inductor and the first actuating portion;

wherein the sixth switch is coupled between the inductor and the second actuating portion.

14. The driving circuit of claim 10, wherein the first switch is coupled between the first actuating portion and the first node;

wherein the second switch is coupled to the first actuating portion and the second node;

wherein the third switch is coupled between the second actuating portion and the first node;

wherein the fourth switch is coupled to the second actuating portion and the second node.

15. The driving circuit of claim 14, wherein within a first period during which the first voltage is applied on the first actuating portion and the second voltage is applied on the second actuating portion, the first switch and the fourth switch are conducted, and the second switch and the third switch are cutoff;

wherein within a second period during which the second voltage is applied on the first actuating portion and the first voltage is applied on the second actuating portion, the second switch and the third switch are conducted, and the first switch and the fourth switch are cutoff.

16. The driving circuit of claim 1, wherein the driving circuit generates a first signal at the first node and generates a second signal at the second node;

wherein the first signal comprises a first AC (alternating current) component;

wherein the second signal comprises a second AC component.

17. A wearable sound device, comprising:

a venting device, comprising a film structure and an actuator, wherein the film structure comprises a first flap and a second flap, and the actuator comprises a first actuating portion disposed on the first flap and a second actuating portion disposed on the second flap;

a driving circuit, comprising a first node and a second node;

wherein the first actuating portion and the second actuating portion are coupled to the first node and the second node;

wherein the venting device is configured to be controlled to open a vent or seal the vent;

wherein the driving circuit generates a first voltage at the first node and generates a second voltage at the second node, in order to open the vent;

wherein the driving circuit generates a third voltage at both the first node and the second node, in order to seal the vent;

wherein the first voltage is larger than the third voltage, and the third voltage is larger than the second voltage.

18. The wearable sound device of claim 17, wherein the driving circuit comprises an amplifying circuit, and the amplifying circuit comprises an error amplifier and has an amplifying gain.

19. The wearable sound device of claim 17, wherein the driving circuit comprises a low-dropout regulator (LDO) and a charge pump, coupled between the error amplifier and the first node.

20. The wearable sound device of claim 17, wherein the driving circuit comprises a swapping module;

wherein the swapping module is coupled between the first actuating portion and the second actuating portion;

wherein the swapping module is configured to swap the first voltage from the first actuating portion to the second actuating portion and to swap the second voltage from the second actuating portion to the first actuating portion.

21. The wearable sound device of claim 17, wherein when the venting device is controlled to open the vent, the first flap is actuated to move toward a first direction and the second flap is actuated to move toward a second direction opposite to the first direction during a first period, and the first flap is actuated to move toward the second direction and the second flap is actuated to move toward the first direction during a second period.

22. The wearable sound device of claim 21, wherein during the first period, the first actuating portion receives the first voltage and the second actuating portion receives the second voltage;

wherein during the second period, the first actuating portion receives the second voltage and the second actuating portion receives the first voltage.

23. A venting device, comprising:

a first flap and a second flap; and a portion disposed between free ends of the first and second flaps;

wherein the venting device is configured to be controlled to open a vent or seal the vent;

wherein the first and second flaps bend downward, in order to open the vent;

wherein the first and second flaps are actuated to maintain a flat position, in order to seal the vent.

24. The venting device of claim 23, further comprising:

a first actuating portion disposed on the first flap; and a second actuating portion disposed on the second flap;

wherein when the venting device is controlled to seal the vent, the first and second actuating portions receive a voltage.

25. The venting device of claim 23, comprising a first actuating portion disposed on the first flap; and a second actuating portion disposed on the second flap;

wherein when the venting device is controlled to seal the vent, the first actuating portion receives a voltage plus a first AC (alternating current) component, and the second actuating portion receives the voltage plus a second AC component.

26. A venting device, comprising:

a first flap and a second flap;

wherein the first flap is actuated to move toward a first direction and the second flap is actuated to move toward a second direction opposite to the first direction during a first period in order to open a vent, and the first flap is actuated to move toward the second direction and the second flap is actuated to move toward the first direction during a second period in order to open the vent.

27. The venting device of claim 26, comprising:

a first actuating portion disposed on the first flap; and a second actuating portion disposed on the second flap;

wherein during the first period, the first actuating portion receives a first voltage and the second actuating portion receives a second voltage;

wherein during the second period, the first actuating portion receives the second voltage and the second actuating portion receives the first voltage.

28. The venting device of claim 26, wherein when the venting device is controlled to seal the vent, the first and second actuating portions receive a third voltage;

wherein the first voltage is larger than the third voltage, and the third voltage is larger than the second voltage.

* * * * *